No. 674,977. Patented May 28, 1901.
A. H. & A. W. MOYES.
AIR BRAKE SYSTEM.
(Application filed Aug. 28, 1899.)
(No Model.) 3 Sheets—Sheet 1.
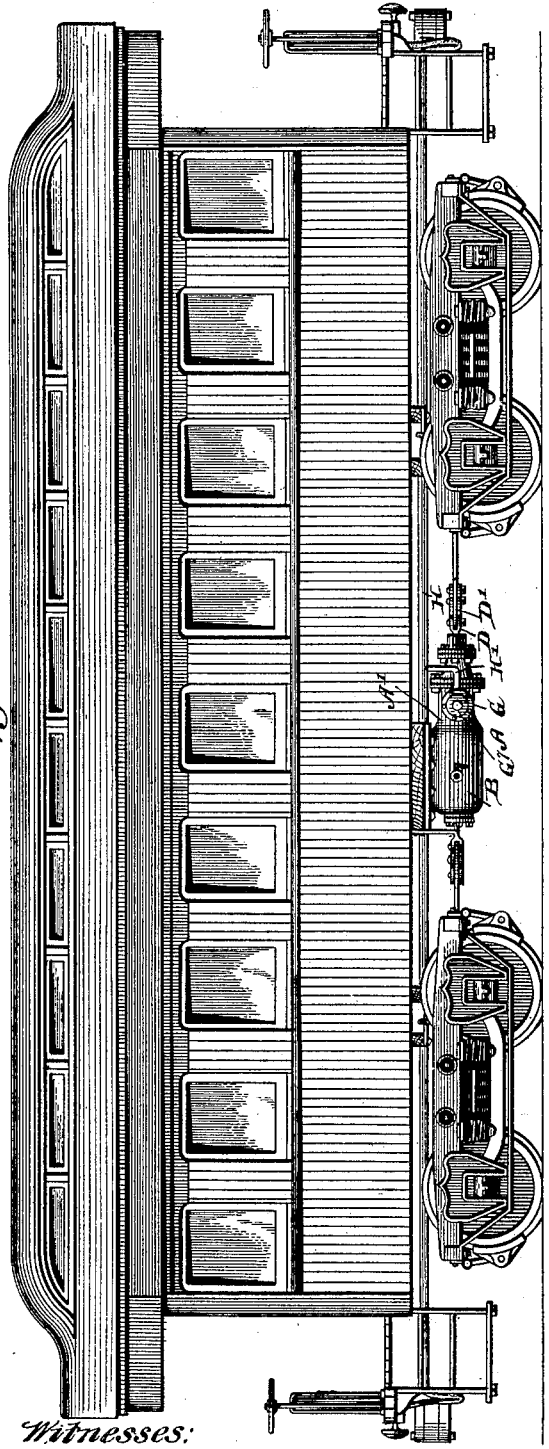
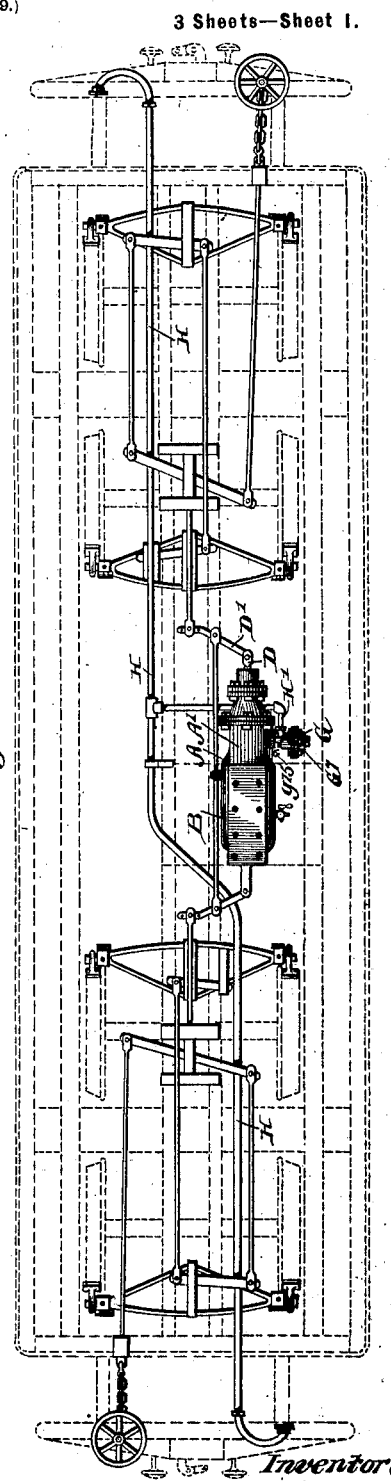

No. 674,977. Patented May 28, 1901.
A. H. & A. W. MOYES.
AIR BRAKE SYSTEM.
(Application filed Aug. 28, 1899.)
(No Model.) 3 Sheets—Sheet 2.
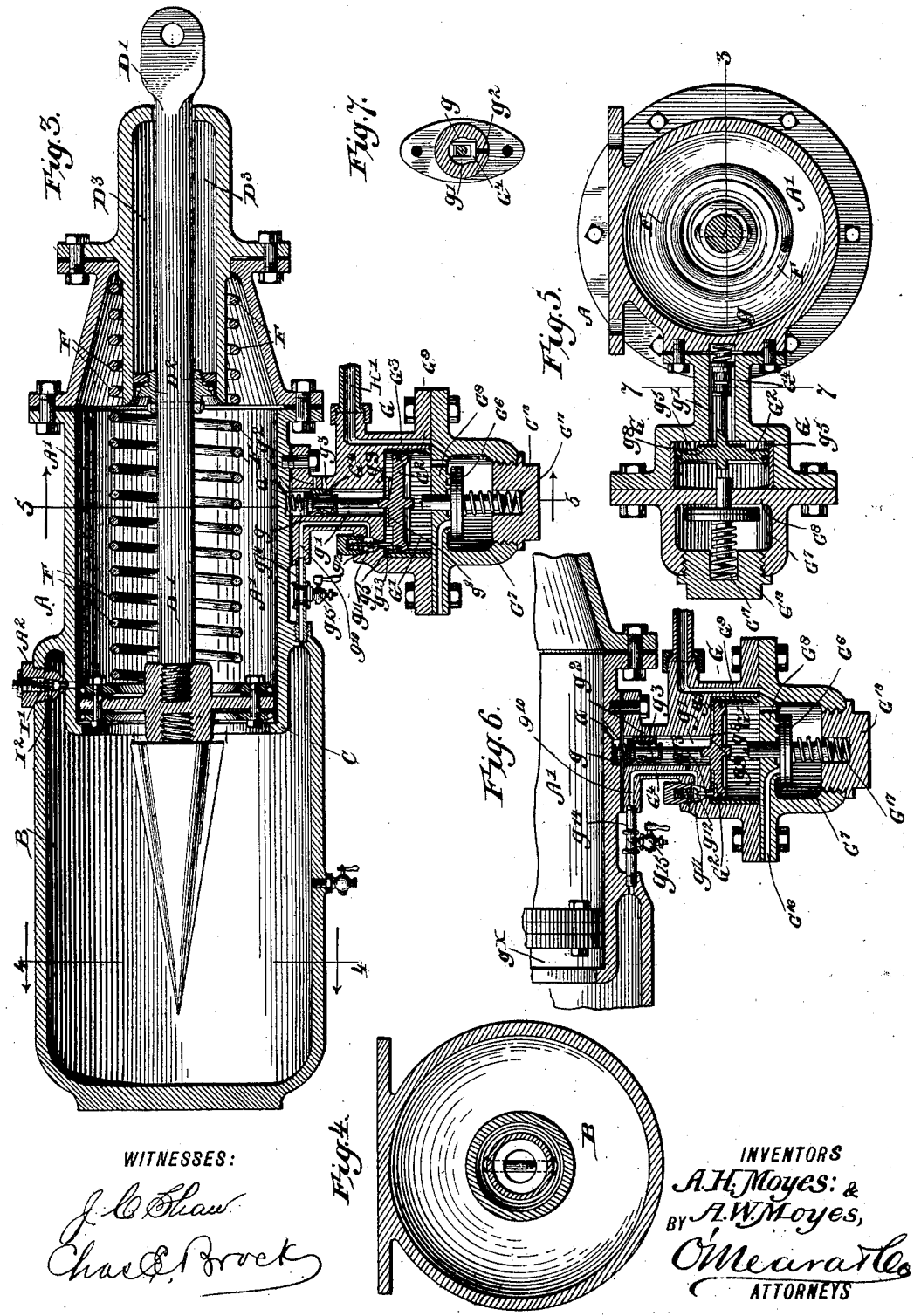
WITNESSES:
INVENTORS
A. H. Moyes &
A. W. Moyes,
BY
O'Meara &Co.
ATTORNEYS No. 674,977. Patented May 28, 1901.
A. H. & A. W. MOYES.
AIR BRAKE SYSTEM.
(Application filed Aug. 28, 1899.)
(No Model.) 3 Sheets—Sheet 3.
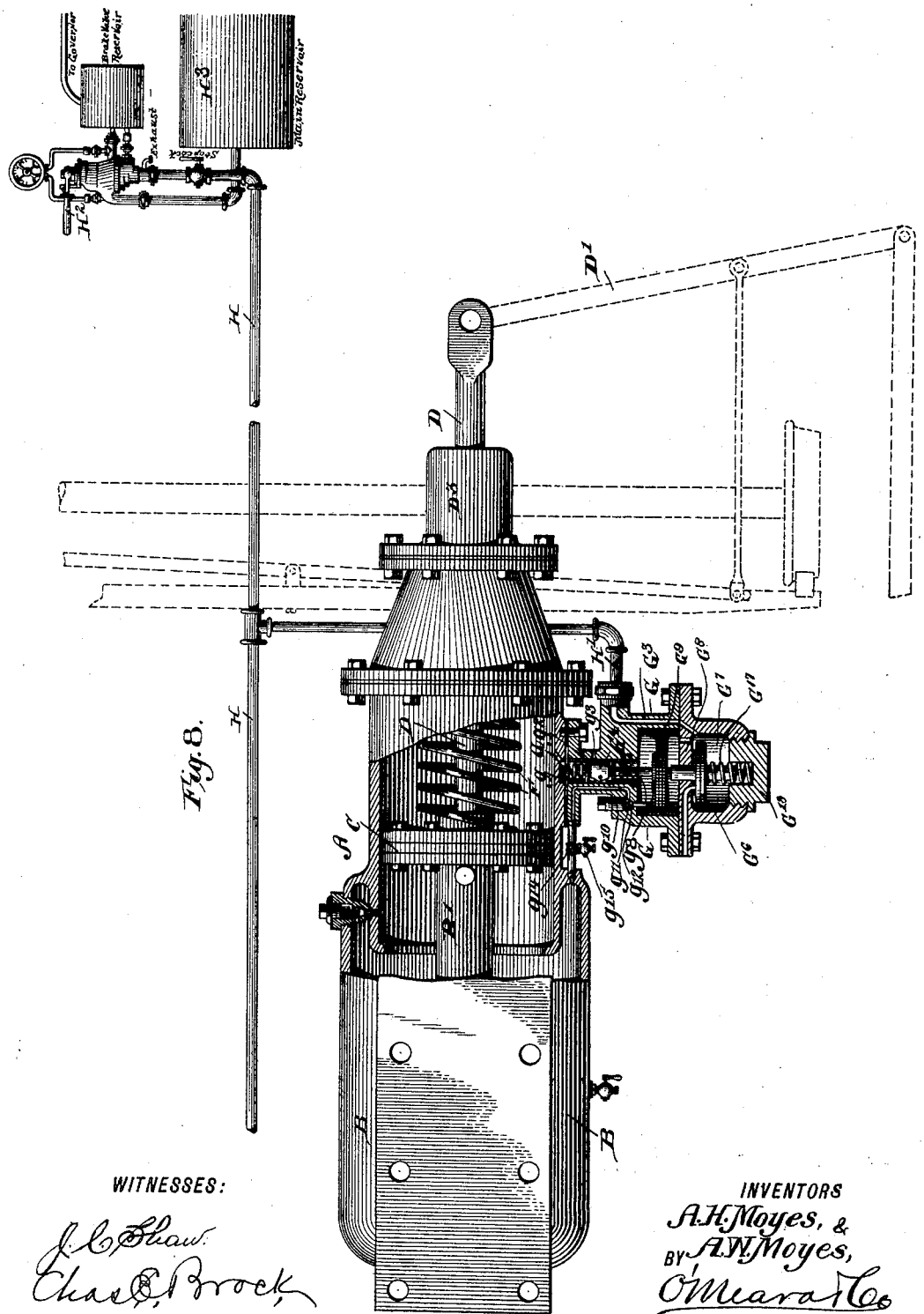
WITNESSES:
INVENTORS
A.H. Moyes, &
BY A.W. Moyes,
O'Meara & Co.
ATTORNEYS

UNITED STATES PATENT OFFICE.

ALEXANDER H. MOYES AND ALEXANDER W. MOYES, OF OGDEN, UTAH.

AIR-BRAKE SYSTEM.

SPECIFICATION forming part of Letters Patent No. 674,977, dated May 28, 1901.

Application filed August 28, 1899. Serial No. 728,803. (No model.)

*To all whom it may concern:*

Be it known that we, ALEXANDER H. MOYES and ALEXANDER W. MOYES, citizens of the United States, residing at Ogden, in the county of Weber and State of Utah, have invented a new and useful Air-Brake System, of which the following is a specification.

This invention relates generally to fluid-pressure brakes, and primarily has for its object to provide a new and improved brake system arranged to quickly and positively apply or release the brakes and whereby the brake-pressure can be easily graduated without entirely releasing the same.

The invention relates particularly to certain improvements upon Patent No. 563,673, granted July 7, 1896, to Alexander H. Moyes.

The invention also has for its object to provide a brake system of the kind stated having a double-acting valve mechanism having supplemental devices automatically governed by the varying movement of the piston of the main valve, whereby a quick or partial release of the brakes may be obtained and whereby the charging or recharging of the auxiliary cylinder can be easily and positively effected.

Another object of the invention is to provide an emergency-valve whereby the air can escape directly from the main pipe through the branch pipe of each car, thus getting rid of the air at each car instead of letting it out through the engineer's valve.

With other objects in view, which will be hereinafter referred to, our invention consists generally of a double-acting valve connected with the train-pipe, the brake, and the auxiliary valve-piston and adapted when shifted to connect the brake-cylinder with the outer air, and also in an emergency-valve operated by the double-acting valve to discharge the air from the branch pipe.

The invention also consists in the peculiar combination and novel arrangement of parts, such as will be first described in detail and then be specifically pointed out in the appended claims, reference being had to the accompanying drawings, in which—

Figure 1 is a side elevation of a passenger-coach equipped with our improved air-brake mechanism. Fig. 2 is an inverted plan of the same. Fig. 3 is a horizontal section of the combined brake and auxiliary cylinder and the valve mechanism connected therewith, taken on the line 3 3 of Fig. 5. Fig. 4 is a transverse section of the auxiliary cylinder on the line 4 4 of Fig. 3. Fig. 5 is a transverse section of the brake-cylinder and valve mechanism on the line 5 5 of Fig. 3. Fig. 6 is a detail view of the double-acting valve mechanism, showing the parts arranged to feed the air to both sides of the brake-piston. Fig. 7 is a detail cross-section on the line 7 7 of Fig. 5, and Fig. 8 is a sectional plan view illustrating the brake-piston as shifted to an apply position and the valve mechanism set to connect the brake-cylinder with the outer air, the train-pipe and air-controlling devices therefor being also shown in this figure.

Referring to the accompanying drawings, A indicates the cylinder, which is of the combination type, it having a brake-piston chamber A' and an auxiliary chamber B, and such cylinder is attached in any suitable manner to the car. (See Fig. 2.)

C indicates the brake-piston, which has a push-rod D connected at its outer end with a lever D', connected with the brake mechanism of the car. The piston C is held spring-pressed back to its rear or normal position by the spring F. At one side the brake-cylinder A' has a feed-port $a$, which opens into the feed-groove $g$ in the slide-valve passage $g'$ of the double-acting valve-holding cylinder G, which groove $g$ connects with exit-ports $g^2 g^3$, which open into the outer air, and with the piston-chamber G', in which the piston $G^2$ of the double-acting valve travels. The chamber or cylinder G' has a port $G^3$, which connects with the branch pipe H' of the train-pipe H, which is connected in the usual manner with the engineer's valve $H^2$ and the main reservoir $H^3$. The piston $G^2$ carries a slide-valve $G^4$ in the passage $g'$, leading from the cylinder G' to the port $a$, disposed near front end of the cylinder A', as shown. The slide-valve $G^4$ normally closes the air-escape ports $g^2 g^3$, located one in front the other, so that when the piston $G^2$ moves outward in the cylinder G' upon reducing the pressure in the train-pipe H and the slide-valve $G^4$ moves with the said piston it uncovers the first port $g^2$, and in case of an emergency it will also uncover the port $g^3$ to open up communication between the brake-cylinder A' and the outer air.

It will be noticed that the train-pipe port opens into an outer cup portion of the valve-chamber G and discharges through an apertured plate $G^8$, which covers such cup portion $G^7$, and in this portion $G^7$ is disposed a spring-pressed emergency-valve $G^6$, against which the outer stem of piston $G^2$ strikes when thrown to its utmost position and when the pressure in the train-pipe is reduced to move the parts to apply the brakes.

$G^9$ indicates a feed-groove in the wall of the valve-piston chamber, which serves when the piston is to its uppermost or innermost position to connect the passage-groove $g$ and cylinder A' with the train-pipe. It will be observed by reference to Figs. 3 and 6 that the piston $G^2$ has on its inner face a boss $g^8$, which when the said piston is moved to its innermost position fits over and closes the slide-valve passage, but leaves a smaller annular space $g^5$ between such piston and the inner end of the piston-chamber for a purpose presently explained, such boss $g^8$, however, having a radial groove $g^9$, which connects the groove $G^9$ with the slide-valve chamber and the groove $g$, as clearly shown.

At one side the valve-chamber G has a port $g^{10}$, which opens into a valve-chamber $g^{11}$, held in communication with the cylinder G' and provided with a puppet or spring-actuated valve $g^{12}$, which normally closes off the port $g^{10}$ from the cylinder G' and which has a short stem $g^{13}$ projected into the cylinder, as shown.

The upper end of the stem of the double-acting valve seats in a back-pressure spring, which when the pressure in the brake and auxiliary cylinders equals that of the train-pipe pressure has a tensile force in practice sufficient to move the piston $G^2$ back from its innermost position one-eighth of an inch, (more or less,) as shown in Fig. 3, and leave an air-space for a purpose presently explained.

The upper end of the port $g^{10}$ connects with a short pipe-section $g^{14}$, (having a valve $g^{15}$,) which communicates with the auxiliary cylinder B, as shown.

In the rear of the cylinder A' is arranged an escape-port $A^2$, which is normally held closed by a spring-pressed check-valve I', which is adapted to be raised from its seat by the internal air-pressure in cylinder A'. The check-valve chamber also has a port $I^2$, which opens into the interior of the auxiliary reservoir or cylinder B, which, as before stated, is a part of the main cylinder A.

We provide the piston-rod D' with a conical-shaped extension B' and with a piston $D^2$, which fits in a tubular bearing or dash-pot $D^3$ at the front end of the brake-cylinder, as clearly shown, it being obvious that such small piston $D^2$ will serve also as a stuffing-box to stop the air from entering through the piston-rod bearing.

The emergency-valve $G^6$ is normally held to close a port $G^{16}$, which leads from the cup $G^7$ directly into the outer atmosphere. The valve $G^6$ is held in place by means of a spring $G^{17}$, which is located in the socket of the cup $G^7$, and the inner face of this valve $G^6$ is of rubber, and in order to tightly close the end of the port $G^{16}$ and for the purpose of maintaining the said valve in an even position we provide ribs upon the under side of the perforated plate, as most clearly shown in Figs. 3 and 6.

The manner in which our air-brake system is operated is best explained as follows: When the several parts are in the position shown in Fig. 3, the air in the brake-cylinder, auxiliary reservoir, and in the valve-chamber will be of the same pressure as in the train-pipe, it being observed that at this time the small puppet-valve is closed and the slide-valve is over the bleeding-off ports $g^2$ $g^3$ and the piston $G^2$ dropped below the inner wall of its cylinder G', it being manifest that the brake-piston is back to its normal or release position and the valve I' held closed by its spring-pressure. Now to gradually apply the brake it is only necessary to reduce the pressure in the train-pipe—say twenty pounds—by the gage in the engine-cab. As soon as this is done the full pressure in the brake-cylinder will force the piston-valve $G^2$ and slide-valve attached thereto back and bleed off from the brake-cylinder through the port $g^2$ until pressure is reduced twenty pounds, thereby allowing the pressure in the auxiliary cylinder to force the piston forward and apply the brake. Now by admitting, say, ten pounds of air into the brake-cylinder the same will push the brakes off a little from the wheels and at the same time drive the piston of the double-acting valve to its home position, which will push the puppet-valve up (see Fig. 6) and allow air to flow from the auxiliary reservoir to the braking-cylinder, while at the same time air is going into the said braking-cylinder through the feed-groove of the double-acting valve from the main reservoir through the train-pipe, thus effecting a quick and positive partial release action of the piston. When the air from the train-pipe to the brake-cylinder stops flowing and the pressure at all points becomes equal, the spring on the double-acting-valve stem will force the said valve down to the position shown in Fig. 3 and allow the puppet-valve to close. Now when it is desired to release the brakes entirely it is only necessary to again increase the pressure in the train-pipe to the maximum, which will thrust piston $G^2$ home again and allow air from auxiliary reservoir to again discharge into brake-cylinder, reducing, as it were, the back pressure on the brake-piston and utilizing such air to assist in quickly forcing such piston to its normal or home position, it being manifest that when driven to its home position (see Fig. 3) it will uncover the inlet I and allow air to pass through valved opening I' and port $I^2$ from brake-cylinder until the pressure on both sides of the piston inside the double-valve chamber and the train-pipe is again equalized.

The slide-valve G⁴ under the ordinary application of the brakes only uncovers the port $g^2$; but in case of an emergency when the pressure in train-pipe is greatly reduced such slide-valve will also uncover port $g^3$ and allow for a quick escape of air from brake-cylinder, and thereby leave a preponderance of pressure in the auxiliary reservoir to act against the rear end of the piston to force the same forward in the direction of the arrow. At the same time that the slide-valve G⁴ is so operated as to uncover both ports $g^2$ $g^3$ the outer stem of the piston will engage the stem of the emergency-valve, which projects through the perforated plate into the cylinder, and as soon as the piston-stem comes into contact with the stem of the emergency-valve said valve is unseated, thereby opening the port G¹⁶, which permits the air from the branch pipe H' to immediately escape into the outer air, thereby drawing out the air of each branch pipe of each car instead of drawing it out through the engineer's valve. This emergency-valve we have found to be of the utmost importance, inasmuch as the brake can be set more quickly than any of the devices of which we are aware.

From the foregoing description, taken in connection with the accompanying drawings, it will be readily seen that our improved system provides for a gradual or quick release of the brakes, for a graduation of the brake-pressure, for balancing the piston, and for utilizing the air from the auxiliary to not alone move the piston to an apply position, but also to assist in forcing it to a release or normal position.

Having thus fully described our invention, what we claim as new, and desire to secure by Letters Patent of the United States, is—

1. In an air-brake system, the combination of a brake-cylinder, an auxiliary cylinder, a valve-cylinder communicating with the atmosphere and with the brake and auxiliary cylinders, a train-pipe having an uninterrupted communication with the brake-cylinder through the valve-cylinder, and a controlled communication with the auxiliary cylinder through said valve-cylinder, a spring-held valve normally closing said communication between the train-pipe and the auxiliary cylinder, and a valve controlling the communication between the valve-cylinder and the atmosphere and having a piston operating the first-mentioned valve, substantially as described.

2. In an air-brake system, the combination of a brake-cylinder and an auxiliary cylinder, a piston in said brake-cylinder, a valve-cylinder communicating with said brake-cylinder and with the atmosphere, a valve controlling the communication with the atmosphere, a division-wall in said valve-cylinder, a communication between the atmosphere and the outer chamber formed by said division-wall, a spring-held valve in said chamber controlling said communication and having its stem projecting through the division-wall in the path of the stem of the first-mentioned valve, to be operated thereby, and a communication between the air-supply and valve-cylinder, substantially as described.

ALEXANDER H. MOYES.
ALEXANDER W. MOYES.

Witnesses:
T. D. JOHNSON,
A. J. WEBER.